United States Patent
Gallucci et al.

(12) 
(10) Patent No.: US 6,221,556 B1
(45) Date of Patent: Apr. 24, 2001

(54) ARTICLE FOR OPTICAL DATA STORAGE DEVICE

(75) Inventors: Robert R. Gallucci, Mt. Vernon; Frank A. Hoefflin, Evansville; Steven F. Hubbard, Mt. Vernon, all of IN (US); Ramesh Hariharan, Guilderland; Irene Dris, Clifton Park, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/263,341

(22) Filed: Mar. 5, 1999

(51) Int. Cl.$^7$ ................................. G11B 7/24; G11B 7/00
(52) U.S. Cl. ........................... 430/270.11; 428/64.7; 430/945
(58) Field of Search .................... 428/64.2, 64.3, 428/64.7; 264/1.1, 1.33; 430/270.11, 945

(56) References Cited

U.S. PATENT DOCUMENTS

| | | |
|---|---|---|
| 2,465,319 | 3/1949 | Whinfield et al. . |
| 2,675,390 | 4/1954 | Rosenblatt . |
| 2,888,484 | 5/1959 | Delam et al. . |
| 2,999,835 | 9/1961 | Goldberg . |
| 3,028,365 | 4/1962 | Schnell et al. . |
| 3,047,539 | 7/1962 | Pengilly . |
| 3,153,008 | 10/1964 | Fox . |
| 3,334,154 | 8/1967 | Kim . |
| 3,444,237 | 5/1969 | Jaffe . |
| 3,635,895 | 1/1972 | Kramer . |
| 4,001,184 | 1/1977 | Scott . |
| 4,123,436 | 10/1978 | Holub et al. . |
| 4,125,572 | 11/1978 | Scott . |
| 4,131,575 | 12/1978 | Adelmann et al. . |
| 4,188,314 | 2/1980 | Fox et al. . |
| 4,391,954 | 7/1983 | Scott . |
| 4,552,949 | 11/1985 | Mark . |
| 4,680,374 | 7/1987 | Hasuo et al. . |
| 4,734,488 | 3/1988 | Hasuo et al. . |
| 4,754,064 | 6/1988 | Lillwitz . |
| 4,786,692 | 11/1988 | Allen et al. . |
| 4,897,453 | 1/1990 | Flora et al. . |
| 5,239,020 | 8/1993 | Morris . |
| 5,302,574 | 4/1994 | Lawrence et al. . |
| 5,441,997 | 8/1995 | Walsh et al. . |
| 5,478,896 | 12/1995 | Scott . |
| 5,942,585 | 8/1999 | Scott et al. . |

FOREIGN PATENT DOCUMENTS

| | | |
|---|---|---|
| 0 542 464 | * 5/1993 | (EP) . |
| 0 152 012 A2 | 8/1995 | (EP) . |
| 0 737 716 A2 | 10/1996 | (EP) . |
| 0 737 716 | * 10/1996 | (EP) . |
| 846711-A2 | 6/1998 | (EP) . |
| 0 899 302 A1 | 3/1999 | (EP) . |
| 60-032698 | 2/1985 | (JP) . |
| WO 93/04128 | 3/1993 | (WO) . |
| WO 99/48685 | 9/1999 | (WO) . |
| WO 99/63002 | 12/1999 | (WO) . |

OTHER PUBLICATIONS

R. Wimberger–Friedl, M.G.T. Hut & H.F.M. Schoo in Macromolecules, 29, 5453–5458 (1996).

Friefelder et al., Journal of Organic Chemistry, 31, 3438 (1966).

* cited by examiner

Primary Examiner—John A. McPherson

(57) ABSTRACT

Disclosed is an article for the optical storage of data having low birefringence prepared from a mixture of a polycarbonate and a cycloaliphatic polyester. The article may optionally have stabilization and mold release additives that retain transparency, color and processability.

24 Claims, No Drawings

ARTICLE FOR OPTICAL DATA STORAGE DEVICE

FIELD OF THE INVENTION

This invention relates to transparent thermoplastic molding compositions and articles made from them suitable for the optical storage of information.

BACKGROUND OF THE INVENTION

Use of optical storage devices has become common since the advent of the compact disc (CD) widely used for the storage of music, video and other information. Optical storage devices of this type require a transparent substrate with excellent optical properties. This substrate is encoded with information often by molding in a series of pits or depressions. Suitably coated this substrate can be read by a laser to give a series of signals recovering the information stored on the disc. With storage devices of this type, there is a growing need to store more and more information in a smaller space.

Bisphenol A Polycarbonate (BPA-PC) has been widely used for optical storage media applications, however, BPA-PC has some limitations. It is rather difficult to process by injection molding which limits the speed with which discs can be made and the quality and amount of information that can be stored on them. In these applications BPA-PC and optical data storage devices made from it are limited by their birefringence. Birefringence, resulting from the inherent properties of the resin and also from how it was processed (influenced by its rheological properties) can interfere with the recovery of information stored on the device (i.e. disc).

In the further development of optical discs, particularly read-write discs and discs which are capable of storing larger amounts of data, various physical factors become increasingly important. One such factor, which is closely related to the storage capacity of the disc, is birefringence, i.e., the difference between indices of refraction for light polarized in perpendicular directions. Birefringence leads to phase retardation between different polarization components of the laser beam (i.e., a polarization-dependent effect), thereby reducing readability of the disc.

Birefringence has several sources including the chemical nature of the raw material from which the disc is fabricated, the degree of molecular orientation therein, and thermal stresses in a fabricated plastic optical disc. The observed birefringence of a disc is therefore determined by the molecular structure, which determines the intrinsic birefringence, and the processing conditions, which can create thermal stresses and orientation of the polymer chains. Specifically, the observed birefringence is typically a function of the intrinsic birefringence plus the birefringence introduced upon molding articles such as optical discs.

Structural variations of BPA-PC have been made to deal with the birefringence limitations of BPA-PC but many of them do not fully meet the other requirements for a successful optical data storage device material. They are either too brittle, have poor optical properties (low transmittance and /or high haze), or are difficult to process due to their high glass transition temperature (Tg). High processing temperature can also lead to degradation of the polymer chain leading to loss of mechanical properties, color formation (especially yellowing) and generation of gaseous by-products impairing optical properties. Other potential optical materials of low birefringence do not meet the needs of an optical storage device because they are too floppy (have a flex modulus below about 150,000 psi) or have a low thermal capability (Tg below about 80° C.).

Therefore, there is a need to prepare resin compositions and articles made from them that are transparent, have low birefringence and good melt processability.

There are several patents describing specific types of aromatic polycarbonate with improved optical properties or higher thermal capability. Polycarbonates of a specific molecular weight range with at least one pendant aromatic group and an optical disc substrate made thereof are claimed by M. Hasuo et al. in U.S. Pat. No. 4,734,488. These materials are shown to have superior heat resistance (higher Tg) than polycarbonate along with good optical properties.

U.S. Pat. No. 4,680,374 claims an optical substrate with double refraction not greater than $5 \times 10^{-5}$ made of a polycarbonate copolymer of aliphatic substituted bisphenols.

Polycarbonate polymers and copolymers of spiro dihydric phenols and their preparation are disclosed by V. Mark in U.S. Pat. No. 4,552,949 as exhibiting improved heat distortion and retaining transparency. The chain stiffness of these types of polycarbonates is discussed by R. Wimberger-Friedl, M. G. T. Hut and H. F. M. Schoo in Macromolecules, 29, 5453–5458 (1996).

Specific spiro biindane aliphatic diacid copolymers are disclosed as having low birefringence in published EP 846711-A2 entitled Optical Disk grade Copolyestercarbonates Derived from Hydroxyphenyl Indanols.

There are references to transparent blends of aromatic polycarbonates with specific cycloaliphatic polyesters but none address birefringence or the requirements of optical storage devices.

U.S. Pat. No. 4,188,314 describes shaped articles (such as sheet and helmets) of blends of 25–98 parts by weight (pbw) of an aromatic polycarbonate and 2–75 pbw of a poly cyclohexane dimethanol phthalate where the phthalate is from 5–95% isophthalate and 95–10% terephthalate. Articles with enhanced solvent resistance and comparable optical properties and impact to the base polycarbonate resin and superior optical properties to an article shaped from a polycarbonate and an aromatic polyester, such as polyalkylene terephthalate, are disclosed.

There are other patents that deal with polycarbonate polycyclohexane dimethanol phthalate blends for example; U.S. Pat. No. 4,125,572; U.S. Pat. Nos. 4,391,954; 4,786,692; 4,897,453 and 5,478,896. U.S. Pat. No. 5,478,896 relates to transparent polycarbonate blends with 10–99% polyester of CHDM with some minor amount of aliphatic diol and iso and terephthalic acid. U.S. Pat. No. 4,786,692 relates to a 2–98% aromatic polycarbonate blend with a polyester made of cyclohexane dimethanol (CHDM) and ethylene glycol (EG) in a 1:1 to 4:1 ratio with iso and terephthalic acid. U.S. Pat. No. 4,391,954 describes compatible compositions of non halogen polycarbonate (PC) and amorphous polyesters of CHDM and a specific iso/tere phthalate mixture. U.S. Pat. No. 4,125,572 relates to a blend of 40–95% PC, 5–60% polybutylene terephthalate (PBT) 1–60% and 1–60% an aliphatic/cycloaliphatic iso/terephthalate resin. US 4,897,453 describes blends of 10–90 % PC, 10–90% of a polyester of 0.8–1.5 IV, comprised of 1,4-cyclohexane dicarboxylic acid, 70% trans isomer, CHDM and 15–50 wt. % poly oxytetramethylene glycol with 0–1.5 mole % branching agent. Also claimed are molded or extruded articles of the composition. None of these references raise, suggest, or address the question of birefringence and the special needs for an optical data storage material.

SUMMARY OF THE INVENTION

There is a need for resins and articles made from them for the optical storage of data, that are transparent, easy to process in the melt and have low birefringence. Typically, optical resin materials for articles of low birefringence do not fully meet the needs of optical storage devices because the resulting articles are too floppy (have a flex modulus below about 150,000 psi), have a low thermal capability (Tg below about 80° C.), have low light transmission, poor color, are difficult to mold, or have high birefringence.

In accordance with the present invention there is provided an article for optical storage of information comprising a blend of a cycloaliphatic polyester and a polycarbonate with low birefringence. Also described are optical storage media comprising a resin blend of a cycloaliphatic polyester and a polycarbonate for molding optical quality articles, a process for molding optical quality articles, and a process for reading information stored on optical media.

Blends of poly cycloaliphatic polyesters and polycarbonates give transparent compositions which have reduced Tgs compared to the polycarbonate (indicative of improved processability) and articles made from them have low birefringence, as measured by IBR, VBR or Cg as hereinafter explained in detail.

Poly cycloaliphatic polyesters generally have low Tgs and high birefringence however, their blends with polycarbonates give transparent articles with reduced birefringence (compared to the base polyester). The blends have Tgs suitable for easy processing yet having sufficient heat resistance for practical use.

DETAILED DESCRIPTION OF THE INVENTION

Birefringence is an important property of molded optical parts of the present invention. The in-plane birefringence (IBR) is critical to the performance of an optical disc and is defined as the phase retardation experienced by light as it travels through an optical part. IBR is influenced by the optical and rheological properties of the material. IBR is measured by illuminating a part of thickness d with polarized light with wavelength 1 at normal incidence and using a variable phase retarder, such as a Soliel-Babinet compensator, with a linear polarizer to determine the phase shift, D, experienced by the light as it travels through the part. The IBR is the phase shift expressed in units of nanometers and is related to the refractive index difference in the radial (nr) and tangential (nt) directions.

$$IBR \equiv \frac{\Delta}{2\pi}\lambda = d(n_r - n_t)$$

Another key property in optical data storage, particularly magneto-optical storage, is vertical birefringence (VBR). VBR is defined as the difference between the refractive index in the plane of the part (nr) and that perpendicular to the plane (nz). VBR of an optical substrate is influenced by the optical properties of the material. It is measured by finding the retardation experienced by a laser beam as it traverses a part at normal incidence and the retardation at non-normal (but known) incidence. Comparison of the two numbers allows calculation of nr-nz. VBR is dimensionless and is typically expressed on a scale of 10–6.

A third parameter for optical materials is Cg which is the stress-optical coefficient of material in the glassy state. It can be measured with a molded part such as a small bar or disc. Birefringence can be measured by the methods described above. When a stress (s) is applied to the bar, the birefringence will change by an amount, B. The stress-optical coefficient, which has units of Brewsters, is given by:

$$B = C_g \sigma$$

Taken together or separately lower IBR, VBR and Cg values indicate superior optical properties. These properties are especially important in the storage and retrieval of information using optical methods. As these storage and retrieval methods move to increasingly finer scale, the birefringence properties of a material and an article made from it become very important.

Low birefringence is defined as: In-Plane Birefringence (IBR) from –100 to +100 nanometers (nm); Vertical Birefringence (VBR) less than or equal to 300×10–6 and a stress optical coefficient (Cg) less than or equal to 70 Brewsters.

In cases where the polycarbonate has a high Tg and is difficult to process the cycloaliphatic polyester acts to lower the PC Tg while the blend maintains low birefringence and has excellent melt flow. This is especially true of polycarbonates based on spirobiindane (SBI) units. The cup shaped SBI units reduce the birefringence associated with the PC but make the polymer chain very stiff resulting in a high Tg and difficult processing. A blend with a cycloaliphatic polyester reduces Tg making melt processing easier while the blend has excellent optical properties overall.

In order to further enhance performance in optical storage devices, acidic phosphorus based stabilizers are useful to retard melt reaction of the cycloaliphatic polyester and polycarbonate resin and improve color.

In addition specific mold release agents that retain transparency while allowing easy de-bonding of the formed part from the mold are also desirable. Since the discs have such high surface area, due to the textured nature of the disc needed for information storage, easy release from the molding tool is quite important. High molecular weight aliphatic esters like pentaerythritol tetra stearate (PETS) are especially useful.

The most preferred materials will be blends where the polyester has both cycloaliphatic diacid and cycloaliphatic diol components specifically polycyclohexane dimethanol cyclohexyl dicarboxylate (PCCD).

The preferred polycarbonate will be composed of units of BPA, SBI bis phenol, aryl substituted bisphenols, cycloaliphatic bisphenols and mixtures thereof.

The ratio of cycloaliphatic polyester to polycarbonate in the range of 40:60 to 5:95 % by weight of the entire mixture is preferred. Blends from 50:50 to 30:70 are most preferred.

The cycloaliphatic polyester resin comprises a polyester having repeating units of the formula I:

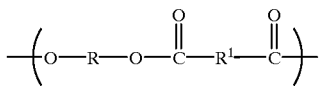

where at least one R or R1 is a cycloalkyl containing radical.

The polyester is a condensation product where R is the residue of an aryl, alkane or cycloalkane containing diol having 6 to 20 carbon atoms or chemical equivalent thereof, and R1 is the decarboxylated residue derived from an aryl, aliphatic or cycloalkane containing diacid of 6 to 20 carbon atoms or chemical equivalent thereof with the proviso that at least one R or R1 is cycloaliphatic. Preferred polyesters of the invention will have both R and R1 cycloaliphatic.

The present cycloaliphatic polyesters are condensation products of aliphatic diacids, or chemical equivalents and aliphatic diols, or chemical equivalents. The present cycloaliphatic polyesters may be formed from mixtures of aliphatic diacids and aliphatic diols but must contain at least 50 mole % of cyclic diacid and/or cyclic diol components, the remainder, if any, being linear aliphatic diacids and/or diols. The cyclic components are necessary to impart good rigidity to the polyester and to allow the formation of transparent blends due to favorable interaction with the polycarbonate resin.

The polyester resins are typically obtained through the condensation or ester interchange polymerization of the diol or diol equivalent component with the diacid or diacid chemical equivalent component.

R and 1 are preferably cycloalkyl radicals independently selected from the following formula:

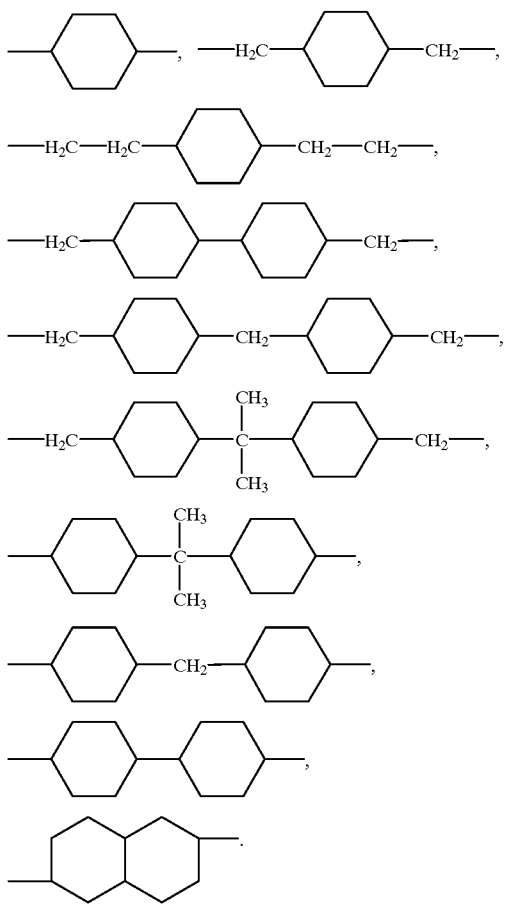

The preferred cycloaliphatic radical R1 is derived from the 1,4-cyclohexyl diacids and most preferably greater than 70 mole % thereof in the form of the trans isomer. The preferred cycloaliphatic radical R is derived from the 1,4-cyclohexyl primary diols such as 1,4-cyclohexyl dimethanol, most preferably more than 70 mole % thereof in the form of the trans isomer.

Other diols useful in the preparation of the polyester resins of the present invention are straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. Preferably a cycloaliphatic diol or chemical equivalent thereof and particularly 1,4-cyclohexane dimethanol or its chemical equivalents are used as the diol component.

Chemical equivalents to the diols include esters, such as dialkylesters, diaryl esters and the like.

The diacids useful in the preparation of the aliphatic polyester resins of the present invention preferably are cycloaliphatic diacids. This is meant to include carboxylic acids having two carboxyl groups each of which is attached to a saturated carbon. Preferred diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or chemical equivalent. Linear dicarboxylic acids like adipic acid, azelaic acid, dicarboxyl dodecanoic acid and succinic acid may also be useful.

Cyclohexane dicarboxylic acids and their chemical equivalents can be prepared, for example, by the hydrogenation of cycloaromatic diacids and corresponding derivatives such as isophthalic acid, terephthalic acid or naphthalenic acid in a suitable solvent such as water or acetic acid using a suitable catalysts such as rhodium supported on a carrier such as carbon or alumina. See, Friefelder et al., Journal of Organic Chemistry, 31, 3438 (1966); U.S. Pat. Nos. 2,675,390 and 4,754,064. They may also be prepared by the use of an inert liquid medium in which a phthalic acid is at least partially soluble under reaction conditions and with a catalyst of palladium or ruthenium on carbon or silica. See, U.S. Pat. Nos. 2,888,484 and 3,444,237.

Typically, in the hydrogenation, two isomers are obtained in which the carboxylic acid groups are in cis- or trans-positions. The cis- and trans-isomers can be separated by crystallization with or without a solvent, for example, n-heptane, or by distillation. The cis-isomer tends to blend better; however, the trans-isomer has higher melting and crystallization temperatures and may be preferred. Mixtures of the cis- and trans-isomers are useful herein as well.

When the mixture of isomers or more than one diacid or diol is used, a copolyester or a mixture of two polyesters may be used as the present cycloaliphatic polyester resin.

Chemical equivalents of these diacids include esters, alkyl esters, e.g., dialkyl esters, diaryl esters, anhydrides, salts, acid chlorides, acid bromides, and the like. The preferred chemical equivalents comprise the dialkyl esters of the cycloaliphatic diacids, and the most favored chemical equivalent comprises the dimethyl ester of the acid, particularly dimethyl-1,4-cyclohexane-dicarboxylate.

A preferred cycloaliphatic polyester is poly(cyclohexane-1,4-dimethylene cyclohexane-1,4-dicarboxylate) also referred to as poly(1,4-cyclohexane-dimethanol-1,4-dicarboxylate) (PCCD) which has recurring units of formula II:

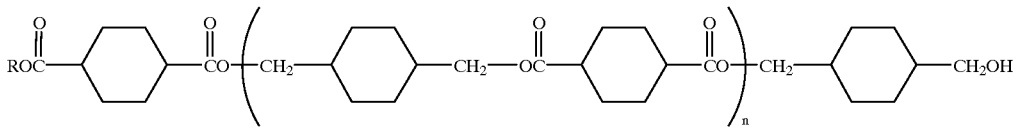

With reference to the previously set forth general formula, for PCCD, R is derived from 1,4 cyclohexane dimethanol; and R1 is a cyclohexane ring derived from cyclohexanedicarboxylate or a chemical equivalent thereof. The favored PCCD has a cis/trans formula.

The polyester polymerization reaction is generally run in the melt in the presence of a suitable catalyst such as a tetrakis (2-ethyl hexyl) titanate, in a suitable amount, typically about 50 to 200 ppm of titanium based upon the final product.

The preferred aliphatic polyesters used in the present transparent molding compositions have a glass transition temperature (Tg) which is above 50° C., more preferably above 80° C. and most preferably above about 100° C.

Also contemplated herein are the above polyesters with from about 1 to about 50 percent by weight, of units derived from polymeric aliphatic acids and/or polymeric aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

Polycarbonates useful in the invention comprise the divalent residue of dihydric phenols, Ar', bonded through a carbonate linkage and are preferably represented by the general formula III:

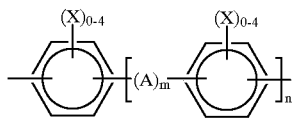

wherein A is a divalent hydrocarbon radical containing from 1 to about 15 carbon atoms or a substituted divalent hydrocarbon radical containing from 1 to about 15 carbon atoms; each X is independently selected from the group consisting of hydrogen, halogen, and a monovalent hydrocarbon radical such as an alkyl group of from 1 to about 8 carbon atoms, an aryl group of from 6 to about 18 carbon atoms, an arylalkyl group of from 7 to about 14 carbon atoms, an alkoxy group of from 1 to about 8 carbon atoms; and m is 0 or 1 and n is an integer of from 0 to about 5. Ar' may be a single aromatic ring like hydroquinone or resorcinol, or a multiple aromatic ring like biphenol or bisphenol A.

The dihydric phenols employed are known, and the reactive groups are thought to be the phenolic hydroxyl groups. Typical of some of the dihydric phenols employed are bis-phenols such as bis(4-hydroxyphenyl)methane, 2,2-bis(4-hydroxyphenyl)propane (also known as bisphenol-A), 2,2-bis(4-hydroxy-3,5-dibromo-phenyl)propane; dihydric phenol ethers such as bis(4-hydroxyphenyl)ether, bis(3,5-dichloro-4-hydroxyphenyl)ether; p,p'-dihydroxydiphenyl and 3,3'-dichloro-4,4'-dihydroxydiphenyl; dihydroxyaryl sulfones such as bis(4-hydroxyphenyl)sulfone, bis(3,5-dimethyl-4-hydroxyphenyl)sulfone, dihydroxy benzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl)sulfide, bis(4-hydroxy-phenyl)sulfoxide and bis(3,5-dibromo-4-hydroxyphenyl)sulfoxide. A variety of additional dihydric phenols are available and are disclosed in U.S. Pat. Nos. 2,999,835, 3,028,365 and 3,153,008; all of which are incorporated herein by reference. It is, of course, possible to employ two or more different dihydric phenols or a combination of a dihydric phenol with a glycol.

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydric phenols such as bischloroformates of 2,2-bis(4-hydroxyphenyl)-propane, hydroquinone, and the like, or bishaloformates of glycol, and the like. While all of the above carbonate precursors are useful, carbonyl chloride, also known as phosgene, and diphenyl carbonate are preferred.

The aromatic polycarbonates can be manufactured by any processes such as by reacting a dihydric phenol with a carbonate precursor, such as phosgene, a haloformate or carbonate ester in melt or solution. U.S. Pat. No. 4,123,436 describes reaction with phosgene and U.S. Pat. No. 3,153,008 describes a transesterification process.

Preferred polycarbonate will be made of dihydric phenols that result in resins having low birefringence for example dihydric phenols having pendant aryl or cup shaped aryl groups like:
Phenyl-di(4-hydroxyphenyl) ethane (acetophenone bisphenol):
Diphenyl-di(4-hydroxyphenyl) methane (benzophenone bisphenol):
2,2-bis(3-phenyl-4-hydroxyphenyl) propane
2,2-bis-(3,5-diphenyl-4-hydroxyphenyl) propane;
bis-(2-phenyl-3-methyl-4-hydroxyphenyl) propane;
2,2'-bis(hydroxyphenyl)fluorene;
1,1-bis(5-phenyl-4-hydroxyphenyl)cyclohexane;
3,3'-diphenyl-4,4'-dihydroxy diphenyl ether;
2,2-bis(4-hydroxyphenyl)-4,4-diphenyl butane;
1,1-bis(4-hydroxyphenyl)-2-phenyl ethane;
2,2-bis(3-methyl-4-hydroxyphenyl)-1-phenyl propane;
6,6'-dihdyroxy-3,3,3',3'-tetramethyl-1,1'-spiro(bis)indane;
(hereinafter "SBI"), or dihydric phenols derived from Spiro biindane of formula IV:

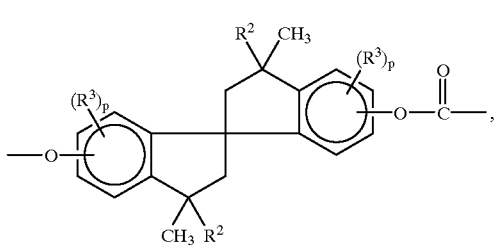

Units derived from SBI and its 5-methyl homologue are preferred, with SBI being most preferred.

Other dihydric phenols which are typically used in the preparation of the polycarbonates are disclosed in U.S. Pat. Nos. 2,999,835, 3,038,365, 3,334,154 and 4,131,575. Branched polycarbonates are also useful, such as those described in U.S. Pat. Nos. 3,635,895 and 4,001,184. Polycarbonate blends include blends of linear polycarbonate and branched polycarbonate.

It is also possible to employ two or more different dihydric phenols or a copolymer of a dihydric phenol with an aliphatic dicarboxylic acids like; dimer acids, dodecane dicarboxylic acid, adipic acid, azelaic acid in the event a carbonate copolymer or interpolymer rather than a homopolymer is desired for use in the preparation of the polycarbonate mixtures of the invention. Most preferred are aliphatic C5 to C12 diacid copolymers.

The preferred polycarbonates are preferably high molecular weight aromatic carbonate polymers have an intrinsic viscosity (as measured in methylene chloride at 25° C.) ranging from about 0.30 to about 1.00 dl/gm. Polycarbonates may be branched or unbranched and generally will have a weight average molecular weight of from about 10,000 to about 200,000, preferably from about 20,000 to about 100,000 as measured by gel permeation chromatography. It is contemplated that the polycarbonate may have various known end groups.

In the thermoplastic compositions which contain a cycloaliphatic polyester resin and a polycarbonate resin it is preferable to use a stabilizer or quencher material. Catalyst quenchers are agents which inhibit activity of any catalysts which may be present in the resins. Catalyst quenchers are described in detail in U.S. Pat. No. 5,441,997. It is desirable to select the correct quencher to avoid color formation and loss of clarity to the polyester polycarbonate blend.

A preferred class of stabilizers including quenchers are those which provide a transparent and colorless product. Typically, such stabilizers are used at a level of 0.001–10 weight percent and preferably at a level of from 0.005–2 weight percent. The favored stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester resin component and the polycarbonate and determining the effect on melt viscosity, gas generation or color stability or the formation of interpolymer. The acidic phosphate salts include sodium dihydrogen phosphate, mono zinc phosphate, potassium hydrogen phosphate, calcium dihydrogen phosphate and the like. The phosphites may be of the formula V:

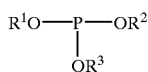

where R1, R2 and R3 are independently selected from the group consisting of hydrogen, alkyl and aryl with the proviso that at least one of R1, R2 and R3 is hydrogen.

The phosphate salts of a Group IB or Group IIB metal include zinc phosphate and the like. The phosphorus oxo acids include phosphorous acid, phosphoric acid, polyphosphoric acid or hypophosphorous acid.

The polyacid pyrophosphates may be of the formula VI:

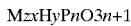

wherein M is a metal, x is a number ranging from 1 to 12 and y is a number ranging 1 to 12, n is a number from 2 to 10, z is a number from 1 to 5 and the sum of (xz)+y is equal to n+2. The preferred M is an alkaline or alkaline earth metal.

The most preferred quenchers are oxo acids of phosphorus or acidic organo phosphorus compounds. Inorganic acidic phosphorus compounds may also be used as quenchers, however they may result in haze or loss of clarity. Most preferred quenchers are phosphoric acid, phosphorous acid or their partial esters.

Preferred polycarbonate cycloaliphatic polyester blends with low birefringence will further comprise a mold release. The mold release composition will retain clarity and color while allowing easy de-bonding of the optical data storage device from the forming mold. This will be especially important for devices that are injection molded. Preferred mold release compounds will be of low molecular weight most preferably below 2000. The preferred mold release can be chosen from the group consisting of low molecular weight polyolefins, esters and amides. Mold release agents will generally be use at 0.01 to 0.5% by weight of the whole formulation.

The most preferred mold releases are pentaerythritol tetra esters, especially the stearate esters. Also preferred are carboxylic acid esters of other polyols like glycerol; for example glycerol mono stearate.

The preferred articles of the invention will produce optical storage devices having the following characteristics:

Visible light transmission as measured by ASTM method D1003, will be greater than or equal to 75%, most preferred above 85%.

In-Plane Birefringence (IBR) will be from –100 to +100 nanometers (nm)

Vertical Birefringence (VBR) will be less than or equal to 300×10–6.

The stress optical coefficient (Cg) will be less than or equal to 70 Brewsters.

The glass transition temperature of the preferred blend will be from 80 to 180° C. with the range of 90–150° C. most preferred.

A flexural modulus (as measured by ASTM method D790) at room temperature of greater than or equal to 150,00 psi is preferred, with a flexural modulus of greater than or equal to 250,000 psi being more preferred.

The yellowness index (YI) will be less than 10, preferably less than 5 as measured by ASTM method D1925.

Haze, as measured by ASTM method D1003, will be below 1% in the preferred composition.

Articles of the invention for optical storage of data can be of any type with compact discs (CD), digital video disc (DVD), magneto optical discs being most preferred. Devices can also be recordable and rewritable optical data storage media. In the most preferred devices a reflective metal layer is attached directly to the resin blend substrate where the metal is aluminum, gold or silver.

The substrate will have a plurality of pits or depressions to encode data.

The data will be read from the optical recording device by a laser.

EXAMPLES

The following examples serve to illustrate the invention but are not intended to limit the scope of the invention. Control experiments are designated by letters, examples of the invention are designated by numbers.

Blends were prepared by tumbling all ingredients together for 1–5 min at room temperature followed by extrusion at 250–300° C. on a co-rotating 30 mm vacuum vented twin screw extruder. Blends were run at 300 rpm. The output was cooled as a strand in a water bath and pelletized.

The resultant materials were dried at 100–130° C. for 3–6 h and injection molded in discs or sections of discs (fans) for evaluation of optical properties.

In this work Bisphenol A Polycarbonate (BPA-PC) was molded into the test parts under the same conditions as the examples of the invention and was used as a basis for comparison. BPA-PC is widely used for the production of laser read compact discs for optical storage of information.

IBR, VBR and Cg were measured on injection molded center gated 120 mm×2 mm discs at 40 mm radius from the center or on 130 mm x 2 mm fan shaped parts at 50 or 65 mm radius from the gate (which was located at the narrow end of the fan).

The glass transition temperature of the blends (Tg) was measured by Differential Scanning Calorimetery (DSC) and will reflect the processability of the resin; a lower Tg being easier to melt and process. However a Tg which is too low will indicate an inability to hold shape under normal environmental heating. For practical heat resistance a Tg above 80° C. is preferred. To have better processability than BPA-PC, a Tg below 150° C. is preferred but any relative reduction in PC Tg is beneficial depending on the overall balance of optical and thermal properties desired.

Materials

| | |
|---|---|
| BPA-PC | Bisphenol A (BPA) Polycarbonate |
| SBI-BPA-PC | 72:28 (mole %) Spirobiindane bisphenol: BPA Polycarbonate |
| PC-Bis AP | Polycarbonate of the bisphenol adduct of acetophenone |
| SBI-DDDA-BPA-PC | Polycarbonate copolymer of spirobiindane bisphenol: 1,12 dodceyl dicarboxylic acid: BPA (18:7:75 mole %) |
| PCCD | Polycyclohexane dimethanol cyclohexyl dicarboxylate |
| PCT | Polycyclohexane dimethanol terephthalate |
| PCCD-PBO | Block copolymer of PCCD with poly butylene oxide (17 wt. %) |

Examples 1–2

Table 1 shows blends of PCCD with BPA-PC or SBI-BPA-PC (Examples 1 & 2).

Compared to BPA-PC alone (Ex. B) the blends show lower IBR or VBR.

The blends also have reduced Tg vs. BPA-PC or SBI-BPA-PC.

Note the SBI-BPA-PC (Ex. C) has very small VBR and IBR values but its high Tg (210° C.) makes it difficult to mold. PCCD (Ex . A) has a very low Tg which limits its heat resistance.

The blends also maintain excellent optical clarity which is critical for optical data storage devices. Percent transmission was >75% for all samples.

TABLE 1

Birefringence from Fan-Gated Plaque of PCCD Blends

| Example | A | B | C | 1 | 2 |
|---|---|---|---|---|---|
| PCCD | 100 | 0 | 0 | 50 | 70 |
| BPA-PC | 0 | 100 | 0 | 50 | 0 |
| SBI-BPA-PC | 0 | 0 | 100 | 0 | 30 |
| Tg oC | 62 | 145 | 210 | 102 | 108 |
| IBR 50 mm radius | 790 | 237 | 5 | 58 | 235 |
| IBR 65 mm radius | 648 | 158 | * | −20 | 186 |
| VBR 50 mm radius | 463 | 527 | 65 | 523 | 373 |
| VBR 65 mm radius | 717 | 598 | * | 432 | 419 |

Blends 1 & 2 contained 0.10% of 45% aqueous phosphorous acid.

Examples 3–5

Table 2 shows various levels of SBI-BPA-PC blended with PCCD (Examples 3–5). All blends are transparent and show reduced Tg vs. the parent polycarbonate (SBI-BPA-PC; Ex. E) and have reduced VBR, IBR and Cg vs. the PCCD control (Ex. D).

TABLE 2

Birefringence from Discs of PCCD Blends

| Example | D | E | F | 3 | 4 | 5 |
|---|---|---|---|---|---|---|
| PCCD | 100 | 0 | 0 | 30 | 50 | 70 |
| BPA-PC | 0 | 0 | 100 | 0 | 0 | 0 |
| SBI-BPA-PC | 0 | 100 | 0 | 70 | 50 | 30 |
| Tg oC | 62 | 210 | 145 | 163 | 148 | * |
| IBR 50 mm radius | 392 | 5 | 146 | 36 | * | 211 |
| VBR 50 mm radius | 403 | 65 | 530 | 129 | * | 353 |
| Cg Brewesters | 58 | 37 | 82 | 37 | 43 | 45 |

Examples 3, 4 & 5 of Table 2 additionally contained: 0.1% 45% aqueous phosphorous acid, 0.2% tris (di-tertbutylphenyl) phosphite, 0.2% Irganox®1076 hindered phenol ester antioxidant from Ciba Geigy Co., 10 and 0.27% pentaerythritol tetrastearate; based on wt % of the whole blend.

Examples 6–12

Table 3 shows blends of PCCD with BPA-PC, PC-Bis AP, SBI-DDDA-BPA-PC and SBI-BPA-PC. All blends were transparent and show improved birefringence properties.

TABLE 3

Birefringence from Discs of PCCD Blends

| Example | 6 | 7 | 8 | 9 | 10 | 11 | 12 |
|---|---|---|---|---|---|---|---|
| PCCD | 50 | 50 | 50 | 50 | 30 | 15 | 5 |
| BPA-PC | 50 | 0 | 0 | 0 | 0 | 0 | 0 |
| SBI-BPA-PC | 0 | 0 | 0 | 50 | 70 | 85 | 95 |
| PC-Bis AP | 0 | 50 | 0 | 0 | 0 | 0 | 0 |
| SBI-DDDA-BPA-PC | 0 | 0 | 50 | 0 | 0 | 0 | 0 |
| Tg oC | 95 | 113 | 97 | 148 | 163 | 183 | 195 |
| IBR 40 mm radius | −20 | −46 | −4 | 4 | 12 | 27 | 27 |
| VBR 40 mm radius | 209 | 286 | 252 | 168 | 170 | 110 | 97 |
| Cg Brewesters | 49 | 46 | * | 38 | 33 | 35 | 31 |

All blends of Table 3 additionally contained: 0.1% 45% aqueous phosphorous acid, 0.2% tris (di-tertbutylphenyl) phosphite, 0.2% Irganox®1076 hindered phenol ester antioxidant from Ciba Geigy Co., and 0.27% pentaerythritol tetrastearate; based on wt % of the whole blend.

Examples 13–14

Table 4 shows examples of the invention using other cyclo aliphatic polyesters PCT and the copolymer PCCD-PBO with SBI-BPA-PC The blends show reduced Tg vs. SBI-BPA-PC and low IBR, VBR and Cg values.

TABLE 4

Discs of PCT and PCCD copolymers Blends

| Example | 13 | 14 |
|---|---|---|
| PCT | 50 | 0 |
| PCCD-PBO | 0 | 50 |
| SBI-BPA-PC | 50 | 50 |
| Tg oC | 95 | 90 |
| IBR 40 mm radius | 10 | −96 |
| VBR 40 mm radius | 72 | 156 |
| Cg Brewesters | * | 33 |

All blends of Table 4 additionally contained: 0.1% 45% aqueous phosphorous acid, 0.2% tris (di-tertbutylphenyl) phosphite, 0.2% Irganox®1076 hindered phenol ester antioxidant from Ciba Geigy Co., and 0.27% pentaerythritol tetrastearate; based on wt % of the whole blend.

What is claimed is:

1. An article for optical storage of information comprising a blend of a cycloaliphatic polyester comprising a cycloaliphatic diacid and cycloaliphatic diol units and a polycarbonate with in plane birefringence from −100 to +100 nm wherein the ratio of polyester to polycarbonate is in the range of 40:60 to about 5:95 % by weight of the entire mixture.

2. An article for optical storage of information according to claim 1 with vertical birefringence less than or equal to 300×10−6.

3. An article for optical storage of information according to claim 1 with stress optical coefficient (Cg) less than or equal to 70 Brewesters.

4. An article of claim 1 where the blend has % transmittance of greater than or equal to 75%.

5. An article of claim 1 where the blend has a glass transition temperature of from about 90 to 150° C.

6. An article of claim 1 where the blend further contains an effective amount of a stabilizer to prevent color formation.

7. An article of claim 6 where stabilizer is chosen from the group consisting of: phosphorus oxo acids, acid organo phosphates, acid organo phosphites, acid phosphate metal salts, acidic phosphite metal salts or mixture thereof giving an article with greater than or equal to about 75% transmittance.

8. An article of claim 6 where the yellowness index is less than or equal to about 5 YI units.

9. An article of claim 1 further comprising an effective amount of a mold release wherein the transmittance of the polycarbonate cycloaliphatic polyester blend is greater than or equal to about 75%.

10. Article of claim 9 wherein the mold release is pentaerythritol tetrastearate.

11. An article of claim 1 where the cycloaliphatic polyester is comprised of cycloaliphatic diacid and cycloaliphatic diol units.

12. An article of claim 11 where the polyester is polycyclohexane dimethanol cyclohexane dicarboxylate (PCCD).

13. An article of claim 1 where the polycarbonate is composed primarily of the following structural units: bisphenol A, spiro biindane bisphenol, an aryl substituted bisphenol, a cycloaliphatic bisphenol or mixtures thereof.

14. An article of claim 1 where the polycarbonate is BPA-PC and the cycloaliphatic polyester is PCCD.

15. An article of claim 1 which is a metal coated optical disc.

16. An article of claim 1 wherein the stored information can be read by a laser.

17. An article of claim 1 which is an optical disc comprising at least one optical quality layer and means for encoding information from a signal, said optical quality layer comprising a blend of a cycloaliphatic polyester comprising a cycloaliphatic diacid and cycloahiphatic diol units and polycarbonate with an in plane birefringence from −100 to +100 nm.

18. An article for optical storage of information comprising a blend of a cycloaliphatic polyester and a polycarbonate wherein said polycarbonate comprises a spiro biindane bisphenol.

19. An article for optical storage of information of claim 18 wherein the cycloaliphatic polyester is comprised of cycloaliphatic diacid and cycloaliphatic diol units.

20. A process for reading stored information on a disc of the type having at least one optical quality layer comprising transmitting a signal to said optical quality layer to read said stored information, said storing means being operably associated with said optical quality layer, said optical quality layer comprising a blend of a cycloaliphatic polyester comprising a cycloaliphatic diacid and cycloaliphatic diol units and polycarbonate with in plane birefringence from −100 to +100 nm.

21. A process according to claim 20 for reading stored information on a disc of the type having at least one optical quality layer comprising transmitting a signal to said optical quality layer to read said stored information, said storing means being operably associated with said optical quality layer, said optical quality layer with a vertical birefringence less than or equal to 300×10−6.

22. A process according to claim 20 for reading stored information on a disc of the type having at least one optical quality layer comprising transmitting a signal to said optical quality layer to read said stored information, said storing means being operably associated with said optical quality layer, said optical quality layer with a stress optical coefficient of less than or equal to 70 Brewsters.

23. A process for reading stored information on a disc according to claim 20 wherein said signal comprises electromagnetic radiation from a laser.

24. A process for reading stored information on a disc according to claim 20 wherein said storage means comprises a plurality of surface depressions on said layer.

* * * * *